US009060532B2

(12) United States Patent
Davis et al.

(10) Patent No.: US 9,060,532 B2
(45) Date of Patent: Jun. 23, 2015

(54) UTILIZATION OF NON-NUTRITIVE ADSORBENTS TO SEQUESTER MYCOTOXINS DURING EXTRACTION OF PROTEIN OR OTHER VALUE ADDED COMPONENTS FROM MYCOTOXIN CONTAMINATED CEREAL OR SEED OIL MEAL

(71) Applicants: The United States of America as represented by the Secretary of Agriculture, Washington, DC (US); North Carolina State University, Raleigh, NC (US)

(72) Inventors: Jack P Davis, Raleigh, NC (US); Timothy H Sanders, Apex, NC (US); Lauren Seifert, Raleigh, NC (US)

(73) Assignees: The United States of America, as represented by the Secretary of Agriculture, Washington, DC (US); North Carolina State University, Raleigh, NC (US)

( * ) Notice: Subject to any disclaimer, the term of this patent is extended or adjusted under 35 U.S.C. 154(b) by 0 days.

(21) Appl. No.: 13/734,264

(22) Filed: Jan. 4, 2013

(65) Prior Publication Data
US 2013/0122143 A1 May 16, 2013

Related U.S. Application Data

(62) Division of application No. 12/836,261, filed on Jul. 14, 2010, now abandoned.

(60) Provisional application No. 61/225,436, filed on Jul. 14, 2009.

(51) Int. Cl.
*A23L 1/015* (2006.01)
*A23L 1/211* (2006.01)

(52) U.S. Cl.
CPC ............. *A23L 1/0156* (2013.01); *A23L 1/2115* (2013.01)

(58) Field of Classification Search
CPC ...................................... A23L 1/0156
USPC ......................................... 426/271
See application file for complete search history.

(56) References Cited

U.S. PATENT DOCUMENTS

| 4,895,808 | A | 1/1990 | Romer |
| 5,498,431 | A | 3/1996 | Lindner |
| 2004/0175434 | A1 | 9/2004 | Schasteen et al. |
| 2006/0263410 | A1 | 11/2006 | Tangni et al. |

OTHER PUBLICATIONS

Rustom, Ismail Y.S. "Aflatoxin in food and feed: occurence, legislation and inactivation by physical methods" in Food Chemistry, vol. 59, No. 1, (1997), pp. 57-67.*

Rustom et al. "Optimization of Extraction of Peanut Proteins with Water by Response Surface Methodology" in J. Food Science, vol. 56, No. 6 (1991), pp. 1660-1663.*

(Continued)

*Primary Examiner* — Elizabeth Gwartney
(74) *Attorney, Agent, or Firm* — David L. Marks; Lesley Shaw; John D. Fado

(57) ABSTRACT

A method for the removal of mycotoxins from cereal or oil seed meal that includes the use of a mycotoxin sequestrant to form a food grade composition for human consumption wherein said composition contains no more or less than an FDA approved level of mycotoxin for a human food product.

3 Claims, 8 Drawing Sheets

(56) References Cited

OTHER PUBLICATIONS

Gudiance for Industry: Action Levels for Poisonous or Deleterious Substances in Human Food and Animal Feed, Aug. 2000, p. 1-2, http://www.fda.gov/food/guidanceregulation/guidancedocumentsregulatoryinformation.*

Bhat, R.V. et al., Mycotoxins and Food Supply, FAO Corporate Document Repository.

Kane, L. et al., Value-Added Processing of Peanut Meal:Enzynnatic Hydrolysis to Improve Functional and Nutritional Properties of Water Soluble Extracts.

Seifert, L. et al., "Value-Added Processing of Peanut Meal:Aflatoxin Sequestration during Protein Extraction" J. Agric. Food Chem. (2010) 58:5625-5632.

Whitlow, L.W., "Evaluation of Mycotoxin Binders" pp. 132-143.

Masimango, N. et al., The Role of Adsorption in the Elimination of Aflatoxin B1 from Contaminated Media File, European Journal of Applied Microbiology and Biotechnology, 1978, vol. 6, pp. 101-105.

Doyle, M.P. et al., Physical, Chemical and Biological Degradation of Mycotoxins in Foods and Agricultural Commodities, Journal of Food Protection, 1982, vol. 45 (10), pp. 964-971.

Ashoor, S.H. et al., Interaction of Aflatoxtin B2a with Amino Acids and Proteins, Biochemical Pharmacology, 1975, vol. 24, pp. 1799-1805.

Doyle, M.P. et al., Physical, Chemical and Biological Degradation of Mycotoxins in Foods and Agricultural Commodities, Journal of Food Protection, 1985, vol. 45 (10), pp. 964-971.

Masimango, N. et al., The Role of Adsorption in the Elimination of Aflatoxin B1 from Contaminated Media, European J. Appl. Microbiol. Biotechnol., 1978, vol. 6, pp. 101-105.

Mulunda, M. et al., A Decade of Aflatoxin M1 Surveillance in Milk and Dairy Products in Developing Countries (2001-2011): A Review, Mycotoxin and Food Safety in Developing Countries, 2013, pp. 39-60.

Natarajan, K.R. et al., Distribution of Aflatoxins in Various Fractions Separated from Raw Peanuts and Defatted Peanut Meal, Journal of the American Oil Chemists' Society, 1975, vol. 52, pp. 44-47.

Park, D.L., Perspectives on Mycotoxin Decontamination Procedures, Food Additives and Contaminants, 1993, vol. 10 (1), pp. 49-60.

Phillips, T.D. et al., Hydrated Sodium Calcium Aluminosilicate: A high Affinity Sorbent for Aflatoxin, Poultry Science, 1988, vol. 67, pp. 243-247.

Rhee, K.C. et al., Processing Edible Peanut Protein Concentrates and Isolates to Inactivate Aflatoxins, J. Am. Oil Chemists' Soc., 1977, vol. 54, pp. 245A-249A.

Seifert, L.E. et al., Value-Added Processing of Peanut Meal: Aflatoxin Sequestration During Protein Extraction, J. Agric. Food Chem., 2010, vol. 58, pp. 5625-45632.

White, B.L. et al., Development of a Pilot-Scale Process to Sequester Aflatoxin and Release Bioactive Peptides from Highly Contaminated Peanut Meal, LWT-Food Science and Technology, 2013, vol. 51, pp. 492-499.

Dorner, J.W., Management and Prevention of Mycotoxins in Peanuts, Food Additives and Contaminants, 2008, vol. 25 (2), pp. 203-208.

* cited by examiner

UTILIZATION OF NON-NUTRITIVE ADSORBENTS TO SEQUESTER MYCOTOXINS DURING EXTRACTION OF PROTEIN OR OTHER VALUE ADDED COMPONENTS FROM MYCOTOXIN CONTAMINATED CEREAL OR SEED OIL MEAL

This is a divisional of application Ser. No. 12/836,261, filed Jul. 14, 2010, which is herein incorporated by reference in its entirety.

REFERENCE TO RELATED APPLICATIONS

This application claims the benefit of U.S. provisional application No. 61/225,436, filed Jul. 14, 2009, which is herein incorporated by reference in its entirety.

BACKGROUND OF THE INVENTION

1. Field of the Invention

This invention relates to a composition and method for preparing the composition which includes the removal mycotoxins and enzymatic hydrolysis to form bioactive peptides from agricultural products that are contaminated with mycotoxins.

2. Description of the Related Art

Mycotoxins are naturally occurring substances produced by certain species of fungi including, for example, *Aspergillus* sp., *Fusarium* sp., *Penicillium* sp. These fungi commonly grow on and infest plant materials such as grains, oilseeds, and grasses. They are most often produced in the field under conditions of environmental stress on the plant (e.g. heat, insects, and drought). Mycotoxins include aflatoxins, ochartoxins, zearalenones, T-2 toxin, HT-2 toxin, diacetoxyscipenol, monoacetoxyscripenol, neosolaniol, nicalenol, deoxynivalenol, 3-acetaldeoxynivalenol, T-2 tetraol, scripentriol, fusarenon, crotoxin, stratoxin H, etc. Aflatoxins are mycotoxins that present remarkable toxicity and hepatocarcinogenicity. Aflatoxins can cause diverse toxic effects on virtually all organs, eventually leading to the development of cancerous tumors capable of spreading throughout the entire body. There are four major aflatoxins: $AfB_1$, $AfB_2$, $AfG_1$ and $AfG_2$, that contaminate crops, with $AfB_1$ and $AfG_1$ having greater toxic potential than aflatoxins $AfB_2$ and $AfG_2$. The International Agency for Research on Cancer has particularly noted that the major forms $AfB_1$ and $AfG_1$, as potent carcinogens, linked primarily to cancer of the liver. Thus, the amount of aflatoxin allowed in human and animal food is regulated by State and Federal agencies. Fumonisin $B_1$ is a mycotoxin that occurs almost exclusively on corn and can cause toxic effects in horses and swine. Fumonisin $B_1$ has been linked to esophageal cancer in humans and has been shown to be a caner initiator and promoter in rodents. Tricothecenes such as for example T-2 toxin, deoxynibvalenol or vomitoxin; ergot, zearolenone, cyclopiazonic acid, patulin, ochartocin A, and secalonic acid D are mycotoxins that can negatively affect impact human and animal health due to their diverse toxic effects. The toxic effects caused by these mycotoxins may be classified as acute or chronic, depending on the level and duration of mycotoxin exposure and species sensitivity.

Virtually all animals in the food chain can be affected by exposure to contaminated food and feed, including humans, who can be exposed directly to toxins through grain handling and consumption or directly through consumption of an unmetabolized parent compound or toxic metabolite products in contaminated meat or livestock products such as milk and cheese. As a result, mycotoxin contamination of agricultural commodities such as corn, wheat, rye, rice, barley, oats, peanuts, pecans, soybeans, cottonseed, apples, grapes, alfalfa, clover, sorghum and fescue grass forages, can result in severe economic loss at all levels of food production such as cost of preharvest prevention, post-harvest treatment, productivity and increased loss of livestock, health care costs, etc.

Oil processing conditions are chosen to optimize the maximum amount of oil extraction with little regard for protein. Using peanut meal, as an example, approximately 97% of the total protein is contained in the two globulins, arachin and conarachin (Basha, S. M. M. Identification of cultivar differences in seed polypeptide composition of peanuts by two-dimensional polyacrylamide gel electrophoresis Plant Physiol. 1979, 63, 301-306). Defatted peanut meal protein content is highly dependent on the type of oil extraction technique used (Basha, S. M. M.; Cherry, J. P. Composition, solubility, and gel electrophoretic properties of proteins isolated from Florunner peanut seeds J. Agric. Food Chem. 1976, 24, 359-365.). Defatted peanut meal can be prepared by hydraulic pressing, screw pressing, solvent (hexane) extraction or pre-pressing followed by solvent extraction (McWatters, K. H.; Cherry, J. P. Potential food uses of peanut seed proteins In Peanut science and technology; Pattee, H. E.; Young, C. T., Eds.; American Peanut Research and Education Society: Texas, 1982; pp 689-736; Cherry, J. P. Peanut protein and product functionality, J. Am. Oil Chem. Soc. 1990, 67, (5), 293-301).

In the early 1900's, the non-food grade peanut meal by-product of oil pressing was sold as cattle feed at about thirty-five dollars per ton (Johns, C. 0.; Jones, D. B. The proteins of the peanut, *Arachis hypogaea*. I. The globulins arachin and conarachin. J. Biol. Chem. 1916, 28, (1), 77-87.). Aflatoxin contaminated peanut meal is sold as animal feed at approximately one hundred seventy-five dollars per ton if the aflatoxin contamination is between 20 to 300 parts per billion (ppb). If the peanut meal has less than 20 ppb, it can be sold as dairy cattle feed at a premium price of approximately two-hundred ten dollars per ton. Highly contaminated peanut meal, greater than 300 ppb, can be sold as fertilizer or mushroom compost at approximately ninety-five dollars per ton (prices are approximate and fluctuate).

Aflatoxins are toxic, carcinogenic compounds which are produced by the fungi *Aspergillus flavus* Link and *Aspergillus parasiticus* Speare (Monteiro, P. V.; Prakash, V. Effect of proteases on arachin, conarachin-I, and conarachin-II from peanut (*Arachis-hypogaea* L). J. Agric. Food Chem. 1994, 42, (2), 268-273.). There are four major naturally occurring aflatoxins, aflatoxin $B_1$, $B_2$, $G_1$, and $G_2$ (Ramos, A. J.; FinkGremmels, J.; Hernandez, E. Prevention of toxic effects of mycotoxins by means of nonnutritive adsorbent compounds. J. Food Prot. 1996, 59, (6), 631-641.). These four compounds are distinguished by their fluorescence color (B=blue; G=green) and their relative chromatographic mobility (McLean, M.; Dutton, M. F. Cellular interactions and metabolism of aflatoxin—an update. Pharmacology & Therapeutics 1995, 65, (2), 163-192.). *Aspergillus flavus* only produces aflatoxin $B_1$ and $B_2$). Aflatoxin $M_1$, found in milk as a metabolite of aflatoxin in cattle feed, is a hydroxylated form of aflatoxin $B_1$.

Most peanut oil is a product of aflatoxin-contaminated peanuts. After the oil is extracted, the aflatoxin remains in the by-product, peanut meal (note: aflatoxin, like all solids in peanuts, are concentrated in the peanut meal after the removal of the oil). The aflatoxin level in the peanut meal must be quantified before it can be sold as animal feed, see Table 1 below. The susceptibility of animals to aflatoxicosis depends upon 1) their ability to activate aflatoxin $B_1$ to aflatoxin $B_1$-8, 9-epoxide and 2) their ability to convert aflatoxins to form glucuronide or sulphate conjugation products to be excreted (Roebuck, B. D.; Wogan, G. N. Species comparison of in-vitro metabolism of aflatoxin-B1. Proc. Am. Assoc. Cancer Research 1974, 15, (MAR), 68-68).

TABLE 1

Action levels for aflatoxin to control contamination in human food and animal feed, as determined by the FDA (61).

|  | Action Level (ppb) |
|---|---|
| Commodity | |
| Peanuts and peanut products | 20 |
| Pistachio Nuts | 20 |
| Brazil Nuts | 20 |
| Human Foods | 20 |
| Milk | 0.5 (aflatoxin $M_1$) |
| Animal Feed | |
| Peanut products intended for finishing beef cattle | 300 |
| Peanut products intended for finishing swine of 100 pounds or greater | 200 |
| Peanut products intended for breeding beef cattle, breeding swine, or Mature poultry | 100 |
| Peanut products intended for immature animals | 20 |
| Peanut products intended for dairy animals, for animal species or uses Not specified above, or when the intended use is not known | 20 |

Current research for detoxifying or inactivating aflatoxins to protect food and animal feed from the toxic effects include irradiation, solvent extraction, density segregation, microbial inactivation, ammoniation, adsorptive materials, and thermal inactivation(Phillips, T. D.; Clement, B. A.; Park, D. L. Approaches to reduction of aflatoxins in foods and feeds. In The toxicology of aflatoxins; Eaton, D. L., Groopman, J. D., Eds. Academic Press: New York, 1994; pp 383-406). Adsorptive materials, or sequestering agents, such as activated charcoal, bentonite and aluminosilicates can be mixed into contaminated animal feed to bind aflatoxins (note that binding occurs upon consumption, i.e. in the GI tracts of livestock), enabling them to pass through the animal gastrointestinal tract, guarding against aflatoxicosis (Ramos, A. J.; FinkGremmels, J.; Hernandez, E. Prevention of toxic effects of mycotoxins by means of nonnutritive adsorbent compounds. J. Food Prot. 1996, 59, (6), 631-641; Huwig, A.; Freimund, S.; Kappeli, O.; Dutler, H. Mycotoxin detoxication of animal feed by different adsorbents. Toxicol. Lett. 2001, 122, (2), 179-188). The ideal toxin-binder should not dissociate internally and should be expelled in the animal feces (Diaz et al., Mycopathologia, Volume 156, 223-226, 2002)). Zeolites, hydrated sodium calcium aluminosilicates (HSCAS) and aluminosilicate-containing clays are the most commonly studied mycotoxin adsorbents. Aluminosilicate clays are generally recognized as safe (GRAS) and the U.S. FDA approved their use as anticaking agents in animal feed up to approximately 2% dry weight basis under title 21, sections 582.2727 and 582.2729 in the Code of Federal Regulations (United States Food and Drug Administration. Code of Federal Regulations—Part 582 Substances Generally Recognized as Safe. http://www.accessdata.fda.gov/scripts/cdrh/cfdocs/cfcfr/CFRSearch.cfm (accessed Aug. 29, 2008)). In vitro aflatoxin binding experiments may not give an accurate prediction of in vivo animal protection.

Activated charcoal is a non-soluble powder formed by pyrolysis of organic materials (Huwig, A.; Freimund, S.; Kappeli, O.; Dutler, H. Mycotoxin detoxication of animal feed by different adsorbents. Toxicol. Lett. 2001, 122, (2), 179-188). This substance is very porous with a high surface area which provides for adsorption of numerous toxic materials, including aflatoxins, making them unavailable for gastrointestinal absorption (Ramos, A. J.; FinkGremmels, J.; Hernandez, E. Prevention of toxic effects of mycotoxins by means of nonnutritive adsorbent compounds. J. Food Prot. 1996, 59, (6), 631-641). Historically, activated charcoal has been used in the medical field for treating poisoning and drug overdoses. Although activated charcoal is odorless, tasteless and non-toxic, it will absorb nutrients, vitamins and minerals, making it unsuitable for use in animal feed.

Yano et al. (U.S. Pat. No. 4,055,674) disclose a method for removal of aflatoxin from materials using a mixed solvent system of liquid dimethyl ether and water. The method reduces the aflatoxin content to 15 ppb or less.

Bentonite, a layered crystalline microstructure comprised primarily of montmorillonite, can also be used to adsorb molecules such as aflatoxins (Ramos, A. J.; FinkGremmels, J.; Hernandez, E. Prevention of toxic effects of mycotoxins by means of nonnutritive adsorbent compounds. J. Food Prot. 1996, 59, (6), 631-641). This clay substance is GRAS approved as a direct food additive and is currently used to remove the protein in white wine processing and to sequester aflatoxins in animal feed.

HSCAS has positive charge deficiencies which create the potential for adsorbing cationic compounds and positively charged molecules, such as aflatoxins (Ramos, A. J.; FinkGremmels, J.; Hernandez, E. Prevention of toxic effects of mycotoxins by means of nonnutritive adsorbent compounds. J. Food Prot. 1996, 59, (6), 631-641). Similarly, zeolites are very porous with a high surface area and a high cation exchange capacity (Huwig, A.; Freimund, S.; Kappeli, O.; Dutler, H. Mycotoxin detoxification of animal feed by different adsorbents. Toxicol. Lett. 2001, 122, (2), 179-188). The surface is polar and binds polar mycotoxins. Zeolite is GRAS and the FDA approves its use as a feed additive and an anti-caking agent (United States Food and Drug Administration. Code of Federal Regulations—Part 582 Substances Generally Recognized as Safe. http://www.accessdata.fda.gov/scripts/cdrh/cfdocs/cfcfr/CFRSearch.cfm (accessed Aug. 29, 2008)). This substance is currently used by beef and dairy cattle, broiler, commercial egg, swine, sheep and turkey producers (ZEO, Inc. Zar-Min Benefits Proven in Research. http://www.zeoinc.com/zar-min.html (accessed Sep. 24, 2008)).

Proteins play a vital role in food functionality and quality, in addition to fulfilling basic nutritional needs. Protein functionality within a food system is highly dependent on solubility and degree of denaturation. Enzymatic hydrolysis of proteins is an established method of generating peptides that have been shown to enhance functional properties such as foaming, emulsification, and solubility, as well as improving nutritional quality (Adler-Nissen, J. Determination of the degree of hydrolysis of food proteinhydrolysates by trinitrobenzenesulfonic acid. J. Agric. Food Chem. 1979, 27, (6), 1256-1262).

Alcalase, pepsin and Flavourzyme are all water soluble, food-grade, commercially available enzymes. These proteases have been well studied and are used to enhance protein functionality in both commercial food and research applications. Bioactive peptides are short-chain amino acids which exhibit specific biological effects, such as antioxidant capacity, upon consumption (Korhonen and Pihlanto, Current Pharmaceutical Design, Volume 9 (16), 1297-1308, 2003). Bioactive peptides can be generated outside the body through hydrolysis, and then consumed, or digested and released naturally inside the body. Currently established sources of bioactive peptides include: chickpea (Clemente et al., J. Agric. Food Chem., Volume 47 (9), 3776-3781, 2007), sunflower (Megias et al., J. Agric. Food Chem., Volume 55 (16), 6509-6514, 2007), corn (Li et al., J. Sci. Food Agric., Volume 88 (9), 1660-1666, 2008), canola (Cumby et al., Food Chem., Volume 102 (1), 144-148,2008), soybean, wheat, rice, barley, and buckwheat (Wang and Mejia, Comprehensive Reviews in Food Science and Food Safety, Volume 4, 63-78, 2005). Recent studies have suggested that peanut protein hydrolysates could be used as a natural antioxidant. The effect of roasting time coupled with enzymatic hydrolysis of roasted defatted peanut seeds on antioxidant capacity was studied (Hwang et al., Comprehensive Reviews in Food Science and Food Safety, Volume 34, 639-647, 2001). It was concluded that antioxidant capacity increased with roasting time from 0 to 60 min at 180° C. and increased further when hydrolyzed with either Esperase or Neutrase. More recently, Chen et al. (J. Sci. Food Agric., Volume 87 (2), 357-362, 2007) reported the antioxidant capacities of peanut protein hydrolysates by measuring the inhibition of linoleic acid autoxidation, scavenging effect on free radicals, reducing power and inhibition of liver lipid autoxidation. Peanut protein hydrolyzed with Alcalase had increased antioxidant capacity over unhydrolyzed peanut protein, but slightly less antioxidant capacity than butylated hydroxytoluene, a synthetic antioxidant (w/v basis) (Chen et al, 2007,supra).

While various systems have been developed for preparing bioactive peptides from other plant materials, there still remains a need in the art for a method for producing a high protein peanut oil by-product that has at least FDA approved levels of aflatoxin in a human food product and contains bioactive peptides. The present invention, different from prior art systems, provides such a method and a nutritional peanut meal human food product made by the novel method.

SUMMARY OF THE INVENTION

It is therefore an object of the present invention to provide a method for removing mycotoxin from agricultural crops such as cereal or oil seed crops wherein said method includes treating said material after oil removal with a mycotoxin sequestrant in an aqueous slurry for a period of time to allow the sequestrant to bind the aflatoxin.

Another object of the present invention is to provide a method that further includes the addition of a protease to the aqueous slurry containing a mycotoxin sequestrant.

A still further object of the present invention is to provide a method that further includes separation steps to form water insoluble solids composition for a animal feed grade product and a soluble solids composition, which can be dried to form food grade compositions for human consumption.

A still further object of the present invention is food grade solid composition containing no more than or less than FDA approved levels of mycotoxin in a human food product prepared by treating a mycotoxin contaminated cereal or seed meal with a mycotoxin sequesterant.

Another object of the present invention is to provide a food grade composition containing no more than or less than FDA approved levels of mycotoxin in a human food product prepared by treating a mycotoxin contaminated cereal or seed meal with a mycotoxin sequesterant and bioactive peptides produced by protease treatment of a cereal or oil seed meal.

Further objects and advantages of the invention will become apparent from the following description.

DETAILED DESCRIPTION OF THE INVENTION

Figure 1:
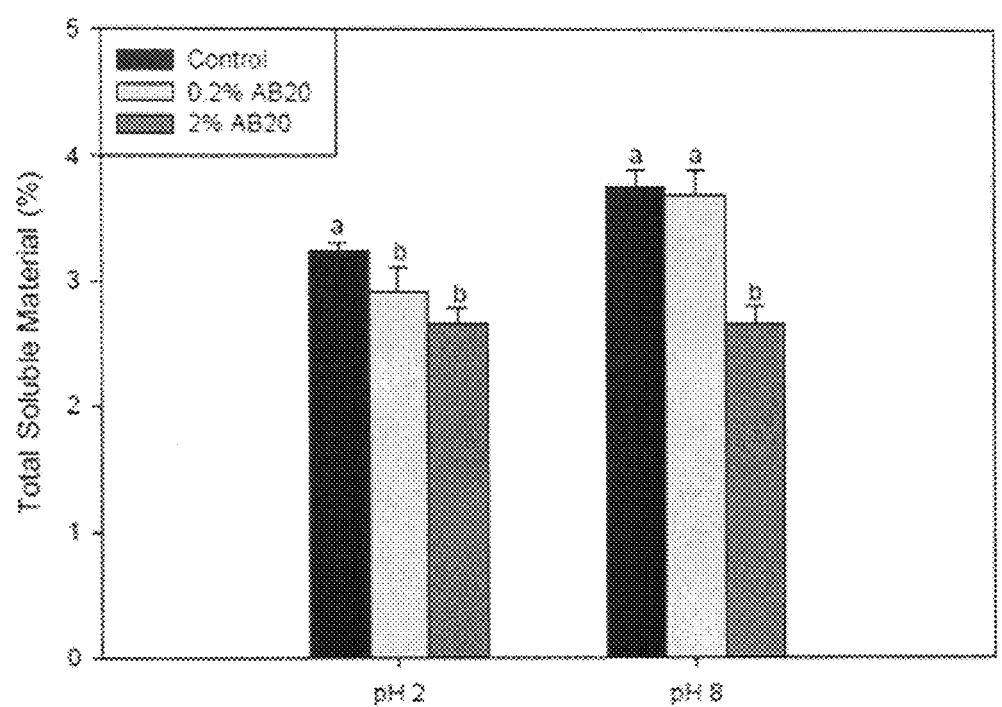
FIG. 1 is a graph showing total solids in the pH of approximately 2 and approximately 8 soluble fractions. Means within a group followed by different letters are significantly different ($p<0.05$).
Figure 2:
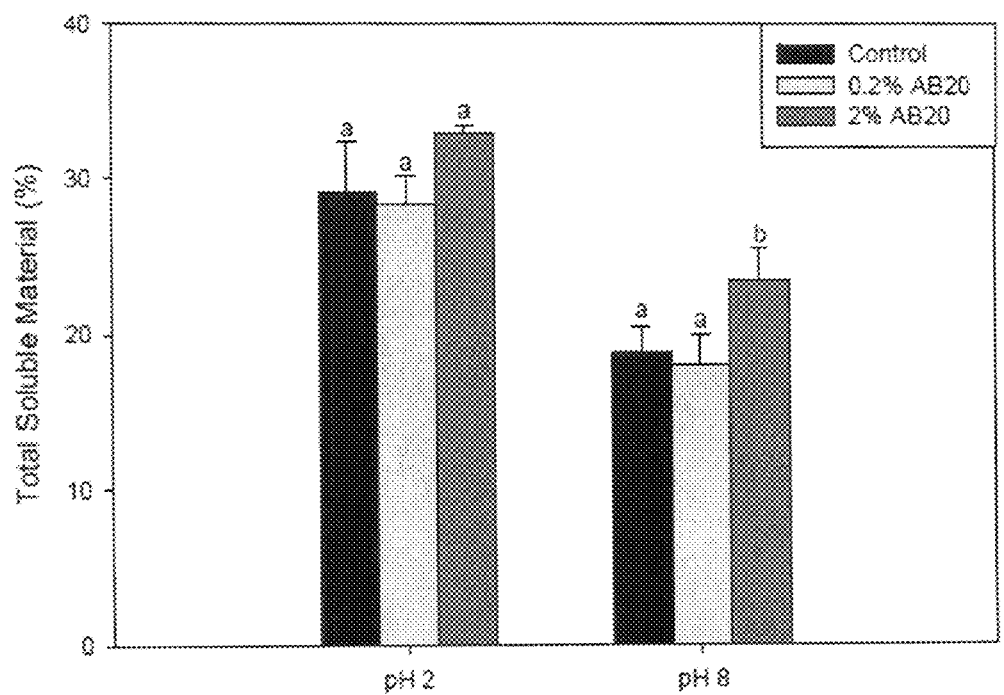
FIG. 2 is a graph showing total solids in the pH of approximately 2 and approximately 8 insoluble fractions. Means within a group followed by different letters are significantly different ($p<0.05$).

The present invention relates to a method for removal of mycotoxins from cereals and oil seeds which are contaminated therewith, by the use of a mycotoxin sequestrant. The invention further encompasses mycotoxin free food grade compositions that contain no more than or less than FDA approved levels of mycotoxin in human food products. The compositions of the present invention can be formed using proteases with the mycotoxin sequestrant to form a composition containing bioactive peptides. Peanut meal is one example of a cereal or oil seed meal that is characterized as a non-food grade material that remains after the extraction of oil from peanuts (*Arachis hypogaea* L.) (McWatters and Cherry, Potential food uses of peanut seed proteins. In Peanut science and technology; Pattee, H. E.; Young, C. T., Eds. American Peanut Research and Education Society: Texas, 689-736, 1982). Effective techniques to guard humans and animals from the toxic effects of mycotoxins such as aflatoxin in food and feed products would be of great value to agricultural industries including the peanut industry. Peanut meal is currently a low economic value commodity that is primarily used as either animal feed or fertilizer, dependent upon the mycotoxin concentration. However, peanut meal is a rich source of protein, typically about 45 to about 60% protein and the applications for this material could be expanded if the aflatoxin is removed. Decreasing or eliminating mycotoxins such as aflatoxin in this high protein by-product has the potential to bring the peanut oil industry more profit by using the meal in applications beyond animal feed.

The term mycotoxin sequestrant means any binder of mycotoxin found in a cereal or seed when added in an amount to at least reduce the level of the mycotoxin found in a cereal or seed meal to levels acceptable for human consumption as directed by the U.S. Food and Drug Administration. Mycotoxin sequestrants include, for example, inorganic binders that are silica based polymers such as zeolites, bentonites, bleaching clays from the refining of canola oil and smectite clays such as, for example, montmorillonite, Na-montmorillonite, Ca-montrillomite, Na-bentonite, Ca-bentonite, beidellite, nontronite, saponite, and hectorite, aluminosilicates, diatomaceious earth, bacteria and yeast cell wall polysaccharides such as glucomannans, peptidoglycans, beta-D-glucan, etc., carbon based polymers such as fibrous plant sources including oat hulls, wheat bran, alfalfa fiber, extracts of wheat cell wall, cellulose, hemicelluloses, and pectin, for example; and synthetic polymers such as, for example, cholestryamine and polyvinylpyrrolidone and derivatives. In one embodiment, clay is added to a slurry of defatted cereal or oil seed at a concentration range of approximately 0.1% to approximately 5% by weight of cereal or oil seed meal. Cereal is used herein to mean any cereals which are normally ingested orally in any optional form of raw or processed grains and meals such as rice, etc. The term oil seed as used herein means to refer to any oil seeds, which are normally edible in any optional form of raw or processed meals and cakes such as peanut, peanut meal, cotton seed, cotton seed meal, cotton seed cakes, and so on.

The method of the present invention includes the steps of mixing a defatted cereal or oil seed composition, preferably a meal, in water to form a slurry that could be approximately 0.1% to approximately 20% or higher w/w aqueous slurry. It is within the ordinary skill in the art to determine the % w/w based on the starting defatted material. To the slurry is added a mycotoxin sequestrant in an amount of approximately 0.1% to approximately 5% w/w. The mycotoxin sequestrant is added in an amount to at least reduce the level of mycotoxin in a cereal or seed meal to levels acceptable for human consumption as directed by the U.S. Food and Drug Administration. The pH of the reaction is adjusted to be between pH of approximately 1 and pH of approximately 10. The pH is preferably adjusted to enhance protein/peptide extraction which is well within the ordinary skill in the art. The slurry containing the mycotoxin sequestrant is stirred at room temperature for a period of time needed to sequester the mycotoxin and produce a product with at least reduced levels of mycotoxin that is FDA acceptable for human consumption. The temperature of the extraction solution can be at least room temperature or adjusted to increase the solubility for extraction which is well within the ordinary skill in the art. The extraction composition is then put through a series of separation steps to partition the soluble and insoluble fractions. The first partition step is centrifugation to form a solid pellet and a supernatant. The supernatant is filtered using a high throughput filter such as for example a double layer of cheese cloth to remove any remaining solids in the supernatant. The pellet contains water insoluble solids which are dried using any technique known in the art to form a consumption for consumption by livestock. The supernatant containing soluble material including soluble proteins is evaporated using any technique known in the art to form a concentrated liquid which is dried using, for example, a spray dryer to form bioactive protein/peptide concentrates suitable for human consumption. The term "suitable for human consumption" is herein defined as having at least reduced levels of mycotoxin that is FDA acceptable for human consumption.

Another embodiment of the present invention includes the addition of protease to increase the solubility and to generate a more nutritious and/or functional food grade composition. A functional food is defined as those foods that encompass potentially healthful products including any modified food or ingredient that may provide a health benefit beyond the traditional nutrients it contains. The proteases chosen for this study are commercially available, water soluble, and food-grade. Non-limiting examples of proteases useful in the present invention include Alcalase, papain, trypsin, pepsin, and Flavourzyme. The protease is added to the cereal or oil seed meal aqueous slurry with the mycotoxin sequestrant. The amount of protease is dependent on the particular enzyme used and the cereal or oil seed meal. Determination of the amount of protease needed is well within the ordinary skill in the art. The temperature and pH of the extraction composition containing the mycotoxin sequestrant and protease can be adjusted to increase solubility for the extraction and/or improve enzymatic hydrolysis both of which are within the ordinary skill in the art.

The following examples are intended only to further illustrate the invention and are not intended to limit the scope of the invention as defined by the claims. Defatted peanut meal and the mycotoxin aflatoxin are used to exemplify the invention. However, it is understood that one of ordinary skill in the art can readily substitute peanut meal with any cereal or oil seed meal and can sequester any mycotoxin given the teachings of the present invention.

EXAMPLE 1

Samples were prepared and treated to remove aflatoxin for preparation of a food grade peanut meal derivative as follows: Defatted peanut meal, containing approximately 110 ppb aflatoxin, was provided by Golden Peanut Company (Alpharetta, Ga.), Astra-Ben 20A™ sodium bentonite clay was provided by Prince Agri Products, Inc (Quincy, Ill.). Methanol, potassium bromide, hydrochloric acid (HCl), acetic acid, and sodium hydroxide (NaOH) were obtained from Fisher Scientific (Fair Lawn, N.J.). Sodium chloride (NaCl) was purchased from Sigma-Aldrich Chemical Company (St. Louis, Mo.). Nitric acid was obtained from VWR International (West Chester, Pa.). AflaTest Developer, AflaTest columns, and mycotoxin standards were acquired from VICAM (Watertown, Mass.). Aflatoxin Mix Kit-M was purchased from Supelco (Bellefone, Pa.).

Dispersions of defatted peanut meal of approximately 10% w/w, were prepared in deionized water and adjusted to either approximately pH 2.0 or approximately pH 8.0 using approximately 2N HCl or approximately 2N NaOH, respectively. Each pH had a control of no clay and two levels of AB20 sodium bentonite clay: approximately 0.2% (w/w) or approximately 2% (w/w, totaling six treatments. Dispersions were stirred at room temperature for approximately 60 minutes. The samples then went through a series of separation steps to partition the soluble and insoluble fractions. First, dispersions were centrifuged at approximately 25000×g for about 20 minutes. The pellet (insoluble fraction) was collected for further testing. Then the supernatant (soluble fraction) was poured through two layers of cheese cloth to exclude any additional insoluble matter. Lastly, the filtered supernatants were centrifuged at approximately 8000×g for about 10 minutes and the soluble fraction was collected for further testing. Soluble and insoluble fractions were frozen at approximately −15 degrees C. prior to further analysis. Each treatment was carried out in triplicate.

Aflatoxin concentration of the insoluble fractions was determined using the AflaTest™ Procedure for Peanuts and Treenuts (approximately 0-50 ppb) on a Series-4 VIACAM fluorometer (VIACAM, Watertown, Mass.). The fluorometer was calibrated according to the instruction manual. An approximately 25 gram sample of the insoluble fraction was added to a blender jar along with approximately 5 gram NaCl and approximately 125 ml of about 60% methanol:about 40% water and mixed on high speed for about 1 minute. The extract was poured into fluted filter paper and filtrate collected in a clean beaker. Samples were then diluted by mixing approximately 20 ml of filtered extract with approximately 20 ml distilled water and stirred. Dilute extract was then filtered through a glass microfiber filter to collect approximately 10 ml in a glass syringe barrel. Column chromatography was conducted by passing the approximately 10 mL filtered extract completely through an AflaTest column at a rate of about 1-2 drops per second. The AflaTest column was eluted with approximately 1 mL HPLC grade methanol at a rate of about 1-2 drops per second and the sample eluate was collected in a glass cuvette. Approximately one mL AflaTest Developer solution was added to the eluate in a cuvette, vortexed, and the fluorescence measured. Accuracy for this method is approximately 0-50 ppb.

Aflatoxin concentration of the soluble fractions was determined using a modification of the VICAM Procedure for Insoluble Fractions described above. This modified procedure was developed to account for the high water content in soluble fractions. Approximately a 25 mL sample of the soluble fraction was added to a blender jar along with approximately 5 grams NaCl and approximately 50 mL pure methanol and mixed at high speed for about 1 minute. The extract was poured into fluted filter paper and filtrate collected in a clean beaker. Samples were then diluted by mixing approximately 10 mL filtered extract with approximately 20 mL distilled water and stirred. Dilute extract was then filtered through a glass microfiber filter to collect approximately 9 mL in a glass syringe barrel. Column chromatography was conducted by passing approximately 9 mL filtered extract completely through the AflaTest column at a rate of approximately 1-2 drops per second. The remaining procedure is as above.

Soluble and insoluble samples were prepared according to the VICAM procedures already described, except HPLC was used for aflatoxin detection instead of column chromatography. HPLC was conducted according to the Association of Official Analytical Chemists (AOAC) method 991.31 (Association of Official Analytical Chemists (AOAC) International. Official Methods of Analysis. Method 991.31: aflatoxins in corn, raw peanuts, and peanut butter; $18^{th}$ Ed. AOAC International: Gaithersburg, Md., 2007). A KOBRA Cell (R-Bioparm Rhone Ltd., Glasgow, Scotland) was used instead of an iodine pump for post column derivatization (Reif and Metzger, J. Chromatogr. A., Volume 692, 131-136, 1995).

Protein concentration of soluble hydrolysates was determined via the bicinchoninic acid (BCA) assay (Pierce, Rockford, Ill.) using bovine serum albumin as the reference protein. All hydrolysates were diluted approximately 1:20 with deionized water prior to analysis.

Statistics were performed using a general linear model with fixed factorial effects for pH and clay to analyze the data from this randomized complete block design. Means separation was conducted for aflatoxin concentration, total soluble material and protein solubility using Tukey's honest significant difference test. All statistics were performed using SAS (Cary, N.C.).

An initial experiment was conducted to test in vitro efficacy of sodium bentonite clay on VICAM methods of aflatoxin detection, results revealed that approximately 2% AB20 was able to reduce or eliminate the available aflatoxin from about a pH 8, approximately 10% peanut meal dispersion (Table 2, below). The majority of the aflatoxin in the control sample was found in the insoluble portion after centrifugation. After approximately 2% AB20 addition, there was no detectable aflatoxin in the soluble fraction and a greatly reduced quantity (<1 ppb) in the insoluble fraction. However, the limit of detection for the VICAM fluorometer is approximately 1 ppb so the number found in Table 1, approximately 0.9 ppb, may not be accurate.

Aflatoxin concentration of all samples in the six different treatments were then quantified using the HPLC method of detection. Aflatoxin in both the soluble and insoluble fractions was adjusted for the total soluble material (See FIGS. 1 and 2) in each sample leading to the aflatoxin concentration on a dry weight basis (Table 3, below). The results show that the addition of AB20 significantly reduced the detectable aflatoxin levels for all samples. The pH of the soluble samples did not significantly affect the clay efficacy. Both approximately 0.2% and approximately 2% AB20 treatments were able to significantly reduce the aflatoxin concentration to levels which are suitable for use in human food products (<20 ppb). The majority of the aflatoxin was found in the insoluble fractions after centrifugation. AB20 was slightly more effective on the pH approximately 8 insoluble samples than pH approximately 2 at approximately 0.2% clay. However, like the soluble samples, there was no impact of pH on insoluble fraction aflatoxin when approximately 2% clay was used. Furthermore, HPLC revealed that aflatoxin $B_1$ was the most predominant of the total aflatoxin in both soluble and insoluble fractions (data not shown). Physical adsorption by sodium bentonite clay was responsible for the elimination of aflatoxin from the peanut meal dispersions. The layered crystalline microstructure and interchangeable cations have the ability to adsorb aflatoxin (Grim and Guven, Developments in Sedimentology. Bentonites: Geology, Minerology, properties and uses; Elsevier: Amesterdam, 1978). More specifically, it has been suggested that adsorption is electrostatically dominated; the negatively charged bentonite clay can adsorb organic substances onto its external surfaces or within its interlaminar spaces by interaction with the partially positive dicarbonyl in aflatoxins or substitution of exchange cations (Ortego et al., Chemosphere, Volume 22(8), 769-798, 1991; Phillips et al., Food Addit. Contam., Volume 25(2), 134-145, 2008). The aflatoxin/clay complex is not detectable by HPLC and will not illicit any harmful effects.

Total soluble material in the soluble portions ranged from approximately 2.5%-4% (FIG. 1). A significant decrease ($p<0.05$) in total solids was observed after the addition of approximately 0.2% and approximately 2% AB20 in the pH approximately 2 samples and only with the addition of approximately 2% AB20 at pH approximately 8. Fractions with the highest total solids and the lowest aflatoxin concentration are the most desirable for spray-drying applications because the end product will have <20 pp aflatoxin, which is the upper limit for human consumption (20). (United States Food and Drug Administration. Action levels for poisonous or deleterious substances in human food and animal feed, http://www.cfsan.fda.gov/~lrd/fdaact.html; accessed Oct. 8, 2007).

The insoluble fractions ranged between approximately 16-34% total soluble materials (FIG. 2). The addition of clay did not have any significant affects on the pH approximately 2 insoluble samples. However, approximately 2% AB20 did significantly ($p<0.05$) increase the total soluble material in the insoluble pH approximately 8 samples. The pH approximately 8 results are consistent with both fractions tested; the total solids in the soluble portions experienced a significant decrease (FIG. 1), simultaneously resulting in a significant increase in the insoluble portion. The pH approximately 2 samples did not follow the same pattern.

Figure 3:
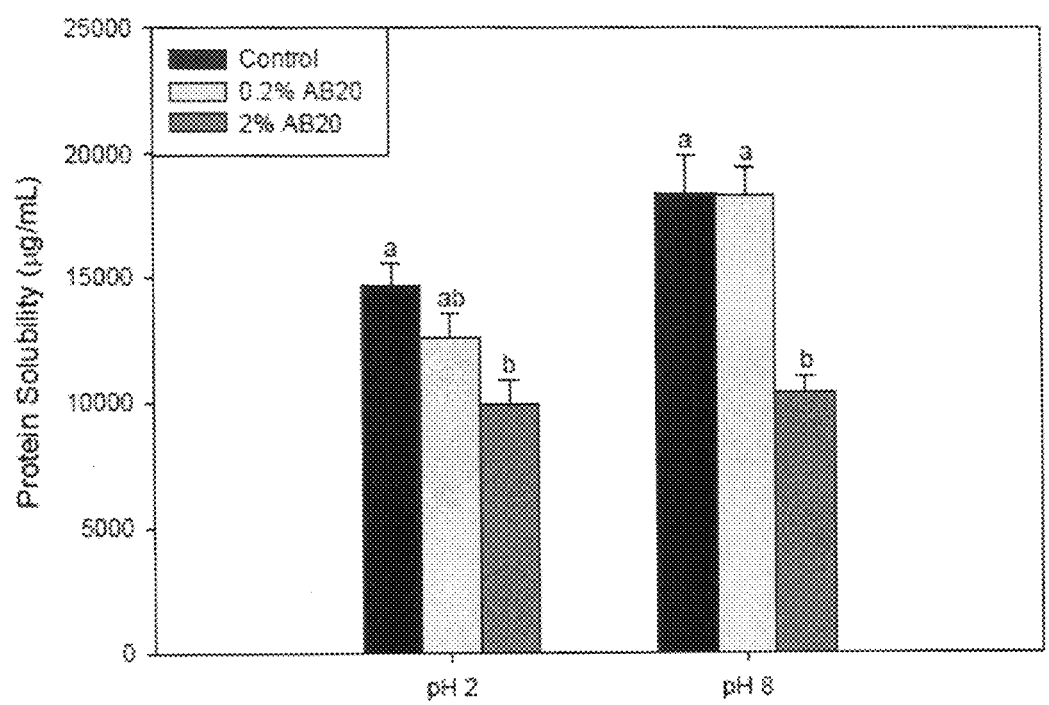
FIG. 3 is a graph showing protein solubility of the pH of approximately 2 and approximately 8 soluble fractions. Means within a group followed by different letters are significantly different ($p<0.05$).

Control and approximately 0.2% AB20 pH approximately 8 soluble samples had more soluble protein than at pH approximately 2 (FIG. 3). A significant decrease ($p<0.05$) in both the pH approximately 2 and pH approximately 8 samples is observed after the addition of approximately 2% AB20 and both of the approximately 2% clay samples had nearly the same protein content. This current data suggests that protein is also bound to the aflatoxin/clay complex and is pulled into the insoluble fraction after centrifugation. The protein solubility data is consistent with the soluble portion total solids data (FIG. 1). In fact, the pH approximately 8 samples have the exact same significance pattern which is indicative that protein is bound to the aflatoxin/clay complex. Total protein content is reduced by approximately 32% for the pH approximately 2 and approximately 44% for the pH approximately 8 soluble fractions (FIG. 3).

TABLE 2

Aflatoxin concentration (ppb) of pH approximately 8 soluble and insoluble peanut meal fractions after treatment with approximately 2% AB20. Results determined using VICAM detection methods.

| Sample | Control | Approx. 2% AB20 |
|---|---|---|
| Soluble | 1.9 | 0 |
| Insoluble | 21.0 | 0.9 |

TABLE 3

Aflatoxin concentration (ppb) of soluble and insoluble peanut meal fractions before and after clay treatment. All numbers are corrected for the total soluble material and reported on a dry weight basis. Results determined using HPLC method of detection. Means within the soluble or insoluble groups followed by different letters are significantly different ($p < 0.05$).

| Sample | pH | Control | Approx. 0.2% AB20 | Approx. 2% AB20 |
|---|---|---|---|---|
| Soluble | 2 | $52.0^{A}$ | $11.6^{B}$ | $0^{B}$ |
| | 8 | $50.0^{A}$ | $4.8^{B}$ | $0^{B}$ |
| Insoluble | 2 | $80.6^{A}$ | $39.8^{BC}$ | $0.9^{D}$ |
| | 8 | $90.7^{AB}$ | $16.3^{CD}$ | $1.5^{D}$ |

EXAMPLE 2

Defatted peanut meal was provided by Golden Peanut Company (Alpharetta, Ga.). The peanut meal was found to be 48.9% protein, as determined by the Dumas combustion method using an Elementar Rapid N III Nitrogen-Analyzer (Elementar Americas, Inc., Mt. Laurel, N.J.). Samples were oven dried overnight at 80° C. Samples (0.2000±0.0200 g) were prepared in tin foil packets for combustion analysis. Protein was calculated from N values using a Kjeldahl factor of 6.25. Pepsin (EC 232-629-3, Porcine stomach mucosa, 1020 units/mg protein), Alcalase from *Bacillus licheniformis* 2.4 AU/g (Batch 056K1213, EC 232-752-2), Flavourzyme from *Aspergillus oryzae* 500 LAPU/g (Batch 084K0543, EC 232-752-2) and trinitrobenzenesulfonic acid (TNBS) were purchased from Sigma-Aldrich Chemical Co. (St. Louis, Mo.). L-Leucine and Trolox (6-hydroxy-2,5,7,8-tetramethylchroman-2-carboxylic acid) were obtained from Fluka BioChemika (Buchs, Switzerland). Fluorescein sodium salt was obtained from Riedel-de Haën (Seelze, Germany). AAPH [2,2'-Azobis(2-amidino-propane)dihydrochloride] was purchased from Wako Pure Chemical (Richmond, Va.). HCl and NaOH were obtained from Fisher Scientific (Fair Lawn, N.J.).

Dispersions of defatted peanut meal (approximately 10% w/w) were prepared in deionized water. Enzymatic hydrolysis was carried out in a water bath under constant stirring using a RXR 1 overhead stirrer (Heidolph Instruments, Schwabach, Germany). The 10% peanut meal dispersions were equilibrated by stirring for 20 min at 37° C., 60° C., or 50° C., the respective optimal temperatures for pepsin, Alcalase, and Flavourzyme hydrolysis. After the 20 min incubation period, the pH was adjusted to 2.0, 8.0, or 7.0, the optimum pH values for pepsin, Alcalase, and Flavourzyme hydrolysis, respectively. Immediately prior to enzyme addition, aliquots of the dispersions were collected to serve as the appropriate unhydrolyzed control samples.

The proteases chosen for this study are commercially available, water soluble, and food-grade. Pepsin is the first in a series of enzymes to begin protein digestion in the human digestive tract. It was chosen to partially simulate how peanut meal would be naturally digested within the body. Pepsin was used at an enzyme/substrate ratio of 19000 units/g peanut meal protein, roughly ten times higher than typically found in the human digestive tract. Alcalase and Flavourzyme were chosen from a commercial processing standpoint. Alcalase is widely used for extensive hydrolysis reactions and was added at an enzyme/substrate ratio of 0.6 Anson Units (AU)/g peanut meal protein. One AU is the amount of enzyme that digests hemoglobin at an initial rate that produces an amount of trichloroacetic acid soluble product which gives the same color with Folin-Ciocalteu Phenol reagent as 1 milliequivalent of tyrosine per minute. Flavourzyme is known to produce less bitter tasting peptides and was used at an enzyme/substrate ratio of 50 Leucine Amino Peptidase Units (LAPU)/g peanut meal protein. One LAPU is the amount of enzyme that hydrolyzes 1 μmol of L-leucine-p-nitroanilide per minute. Samples were collected after 3, 5, 10, 15, 30, 45, 60, 120, 180 and 240 min of hydrolysis. Enzymes were heat inactivated by submerging 12 mL aliquots of the dispersions in sealed 15 mL conical tubes in a water bath at 90° C. for 15 min. Unhydrolyzed controls were also heat treated. Dispersions were centrifuged at 11000×g for 15 min to separate insoluble material. Centrifugation conditions were chosen empirically based on initial experiments and good visual separation between the pellet and the supernatant. Supernatants (hydrolysates) were collected and frozen at −15° C. prior to further analyses. Hydrolysis was carried out in triplicate for each enzyme.

Degree of Hydrolysis (DH) was determined spectrophotometrically using the trinitrobenzenesulfonic (TNBS) acid method with slight modifications (Adler-Nissen, J. Determination of the degree of hydrolysis of food protein hydrolysates by trinitrobenzenesulfonic acid. *J. Agric. Food Chem.* 1979, 27, (6), 1256-1262). Hydrolysates (0.16 mL) were added to 3.84 mL of 1% SDS and vortexed. Then, 0.25 mL aliquots were transferred into test tubes containing 2.0 mL 0.2125 M sodium phosphate buffer (pH 8.2), followed by the addition of 2 mL of 0.1% TNBS to each tube. Tubes were then vortexed and incubated for 60 min at 50° C. in the dark. The reaction of TNBS with the primary amines was quenched by adding 4 mL of 0.1 N HCl. Tubes were cooled to room temperature for 30 min and the absorbencies were read at 340 nm using a UV-1700 UV-Visible Spectrophotometer (Shimadzu Corp., Kyoto, Japan). Concentrations of 0-6 mM L-Leucine were prepared equivalently and used to create a standard curve.

DH values were calculated using the following formula:

$$DH = h/h_{tot} 100\%$$

where h, hydrolysis equivalents, is the number of peptide bonds cleaved during hydrolysis and $h_{tot}$ is the total number of peptide bonds in a given protein. The total number of peptide bonds in the peanut protein substrate was determined by fully hydrolyzing 10% meal dispersion with 6N HCl for 24 h at 90° C. The hydrolysis equivalents, h, were determined by reference to the L-Leucine standard curve.

Protein Solubility was determined using a BCA™ Protein Assay Kit (Pierce, Rockford, Ill.) to determine protein concentration of the soluble hydrolysates. Bicinchoninic acid (BCA) forms a complex with cuprous cation ($Cu_{+1}$) in an alkaline environment. The resulting complex exhibits a purple color that has a strong absorbance at 562 nm. The color produced from this reaction is linear over a broad range of increasing protein concentrations. The protein concentration of the hydrolysates are determined by reference to a standard curve produced from a common protein, bovine serum albumin (BSA). The BSA standard curve ranges from 0 to 2000 μg/mL protein.

Hydrolysates were diluted 1:20 with deionized water. Then 0.1 mL of all diluted hydrolysates and BSA standards were mixed in test tubes with 2 mL working reagent. Working reagent is a 1:50 mixture of 4% cupric sulfate:sodium carbonate, sodium bicarbonate, BCA and sodium tartrate in 0.1 M sodium hydroxide. The test tubes were incubated for 30 min in a 37° C. water bath, cooled to room temperature and the absorbance was read at 562 nm.

Sodium Dodecyl Sulfate-Poluacrylamide Gel Electrophoresis (SDS-PAGE). Hydrolysates were diluted using Novex® Tricine SDS Sample Buffer (2x), NuPAGE® Reducing Agent (10x) and deionized water. Protein concentrations of 10 μg were loaded per well in Novex® 1 mm×10 well pre-cast 16% Tricine Gels (Invitrogen, Carlsbad, Calif.) which are used for resolving low molecular weight proteins and peptides. See Blue® Plus2 Prestained Standard molecular weight marker with 2.5, 3.5, 6, 14, 21, 31, 36, 55, 66, 97, 116 and 200 kDa was used as a reference. As an additional control, protein extracted at pH 8.0 from defatted raw Runner peanuts (variety Georgia Green) was analyzed in an equivalent manner. Electrophoresis was run at 130 V for 90 min. SimplyBlue™ SafeStain was used to stain the gel for 60 min. The gels were destained in deionized water overnight and then dried using Gel-Dry™ Drying Solution.

Total Soluble Material was determined as follows: Approximately 2 g of hydrolysates were analytically weighed in an aluminum dish and heated in a vacuum oven (VWR Scientific, Inc., West Chester, Pa.) at 115° for about 16 hours. Dried samples were cooled to room temperature in a desiccator prior to final mass determination.

The Hydrophilic-Oxygen Radical Absorbance Capacity (H-ORAC) Assay was performed to determine antioxidant capacity of the hydrolysates was determined using an adapted H-ORAC procedure (Davalos, A.; Gomez-Cordoves, C.; Bartolome, B. Extending applicability of the oxygen radical absorbance capacity (ORAC-fluorescein) assay. *J. Agric. Food Chem.* 2004, 52, (1), 48-54; Huang, D. J.; Ou, B. X.; Hampsch-Woodill, M.; Flanagan, J. A.; Prior, R. L. High throughput assay of oxygen radical absorbance capacity (ORAC) using a multichannel liquid handling system coupled with a microplate fluorescence reader in 96-well format. *J. Agric. Food Chem.* 2002, 50, (16), 4437-4444; Prior, R. L.; Hoang, H.; Gu, L. W.; Wu, X. L.; Bacchiocca, M.; Howard, L.; Hampsch-Woodill, M.; Huang, D. J.; Ou, B. X.; Jacob, R., Assays for hydrophilic and lipophilic antioxidant capacity (oxygen radical absorbance capacity (ORAC(FL))) of plasma and other biological and food samples. *J. Agric. Food Chem.* 2003, 51, (11), 3273-3279). Assays were prepared in Costar polystyrene flat-bottom black 96 microwell plates (Corning, Acton, Mass.). A sodium salt solution of Fluorescein was prepared daily at a final concentration of 70 nM in 75 mM phosphate buffer. Trolox standards were prepared daily from 50 to 3.12 μM in phosphate buffer. AAPH was prepared daily at a final concentration of 153 mM in phosphate buffer immediately prior to usage. Fluorescence was measured using the SAFIRE2 monochromator based microplate reader equipped with Magellan (v. 6.1) reader software (Tecan USA, Raleigh, N.C.). Excitation and emission filter wavelengths were set at 483±8 and 525±12 nm, respectively.

The reaction was carried out in 75 mM phosphate buffer at pH 7.4 with a final reaction volume of 250 μl. Alcalase and Flavourzyme hydrolysates 3 through 240 min were diluted 1:2000 in phosphate buffer prior to measurement. The pH of pepsin hydrolysates had to be altered to be compatible with the H-ORAC assay. Ten mL aliquots of the unhydrolyzed control, 3, 60 and 240 min hydrolysate samples were adjusted from pH 2 to pH 7.4 using 1 N NaOH. After pH adjustment, pepsin hydrolysates 3, 60 and 240 min were diluted 1:2500 in phosphate buffer (pH 7.4). All unhydrolyzed control samples were diluted 1:1000 in phosphate buffer. Diluted hydrolysate samples and Trolox standards, both at 130 μL, were added to the wells followed by 60 μL of the Fluorescein solution, which was rapidly added via a multi-channel pipetteman. The plate containing only the samples, standards, and Fluorescein was incubated in the $SAFIRE_2$ for 15 min at 37° C. Following incubation, 60 μL of the AAPH solution was rapidly added via a multi-channel pipetteman. Prior to the first measurement plates were mixed with a 5 s medium intensity orbital shaking, and data points were acquired over 80, 1 min kinetic cycles with a 5 s medium intensity orbital shaking between cycles. Data was reported as relative fluorescent units (RFU) ranging from 0-50000 RFU and exported into Microsoft Excel (Microsoft, Roselle, Ill.) for further analysis. ORAC values were calculated using a linear regression equation between Trolox concentration in μM and the net area under the fluorescence decay curve (Conkerton, E. J.; Ory, R. L. Peanut proteins as food supplements—compositional study of selected Virginia and Spanish peanuts. *J. Am. Oil Chem. Soc.* 1976, 53, (12), 754-756). Antioxidant capacity was reported in μM Trolox equivalents (TE) per milligram of soluble protein in the hydrolysates as determined by the BCA assay.

Statistics were performed using a mixed model with fixed factorial effects for enzyme and time and a random beaker (replication) effect to analyze the DH and protein solubility data from this repeated measures design. Means separation was conducted for total soluble material and antioxidant capacity using Tukey's honest significant difference test. All statistics were performed using SAS (Cary, N.C.).

Figure 4:
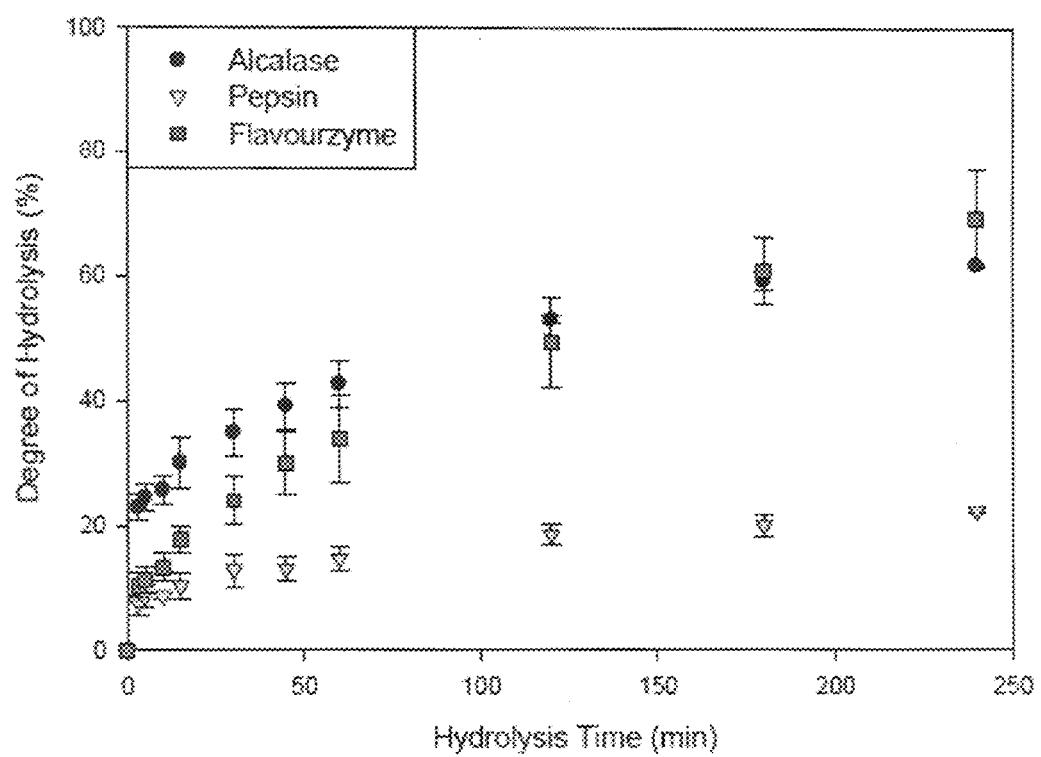
FIG. 4 is a graph showing degree of hydrolysis (DH) for the Alcalase, pepsin, and Flavourzyme soluble fractions.

DH is the relative amount an enzyme is able to digest a protein into smaller peptide fragments. DH increased with increasing time for all enzymes, with the most notable increase occurring within the first 3 min of enzyme addition (FIG. 4). Statistical analyses revealed that the enzyme used and duration of hydrolysis significantly (p<0.0001) affected DH. DH ranged from approximately 20-60% for Alcalase, 10-20% for pepsin and 10-70% for Flavourzyme over a 3-240 min period. This data reflects the differing specificities and concentration of each enzyme. Alcalase, a slightly specific endoproteinase that preferentially cleaves large uncharged residues and terminal hydrophobic amino acids (Sigma-Aldrich Co. Subtilisin A, bacterial proteinase. http://www.sigmaaldrich.com/Area_of_Interest/Biochemicals/Enzyme_Explorer/Analytical_Enzymes/Subtilisin.html (accessed Jul. 25, 2007)), yields hydrolysates with higher DH values than pepsin, a more specific single acidic endopeptidase that preferentially cleaves hydrophobic, aromatic residues (Sigma-Aldrich Co. Pepsin. http://www.sigmaaldrich.com/Area_of_Interest/Biochemicals/Enzyme_Explorer/Analytical_Enzymes/Pepsin.html (accessed Feb. 12, 2008)). Accordingly, Alcalase resulted in the most rapid initial rate of hydrolysis, reaching 20% DH after only 3 min, which exceeds pepsin DH after the full 240 min hydrolysis. The rate of pepsin and Alcalase hydrolysis began to slow after 2 and 3 hours, respectively, which is indicative that all peptide bonds susceptible to enzymatic hydrolysis under the given conditions, have been cleaved. Flavourzyme possesses both endoprotease and exopeptidase activity; however, it was used at an enzyme/substrate ratio for extensive hydrolysis by the exopeptidase activity. Flavourzyme activity accelerated steadily throughout the entire hydrolysis, surpassing Alcalase hydrolysis after 4 hours.

Figure 5:
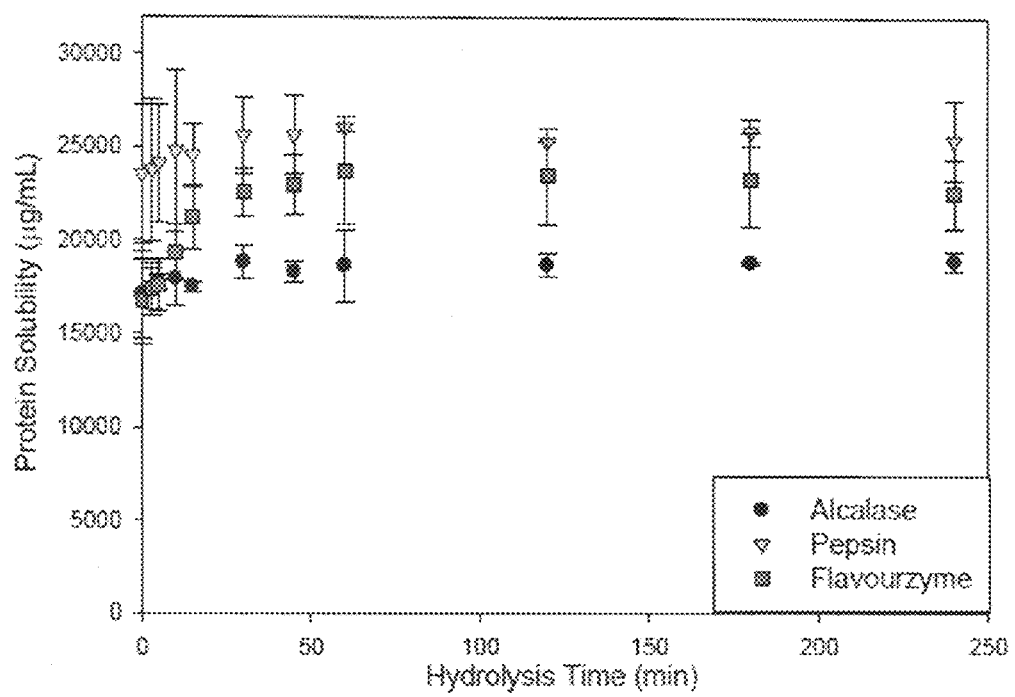
FIG. 5 is a graph showing protein solubility of the Alcalase, pepsin, and Flavourzyme hydrolysates.

Increasing hydrolysis time minimally affected protein solubility as compared to unhydrolyzed controls for Alcalase and pepsin (FIG. 5). A significant increase in protein solubility over time ($p<0.05$) was only observed for the Flavourzyme hydrolysates which accelerated through 60 min then reached a plateau. Pepsin hydrolysates had more soluble protein than either Flavourzyme or Alcalase hydrolysates across all time points. The observed protein solubility is related more to the adjusted pH of the peanut meal dispersions, than to the DH. When preparing the peanut meal dispersion for pepsin hydrolysis, the pH is lowered from pH~6.8 to pH 2.0, passing through the isoelectric point of peanut protein (pI 4.5) (Conkerton, E. J.; Ory, R. L. Peanut proteins as food supplements—compositional study of selected Virginia and Spanish peanuts. *J. Am. Oil Chem. Soc.* 1976, 53, (12), 754-756). At this point, the protein is precipitated, noted by a change in the color and clarity of the dispersions from a translucent brown, to an opaque light tan. Previous research has shown that peanut protein is more soluble at pH 2.0 (pepsin) than at pH 7.0 (Flavourzyme) or pH 8.0 (Alcalase) when extracted in water (Basha, S. M. M.; Cherry, J. P. Composition, solubility, and gel electrophoretic properties of proteins isolated from Florunner peanut seeds. *J. Agric. Food Chem.* 1976, 24, 359-365). The BCA assay is not able to detect single amino acids and dipeptides because they do not catalyze the biuret reaction which is necessary for this spectrophotometric assay. Therefore, any dipeptides or free amino acids generated during extensive hydrolyses are beyond the detection limits of this assay.

Figure 6:
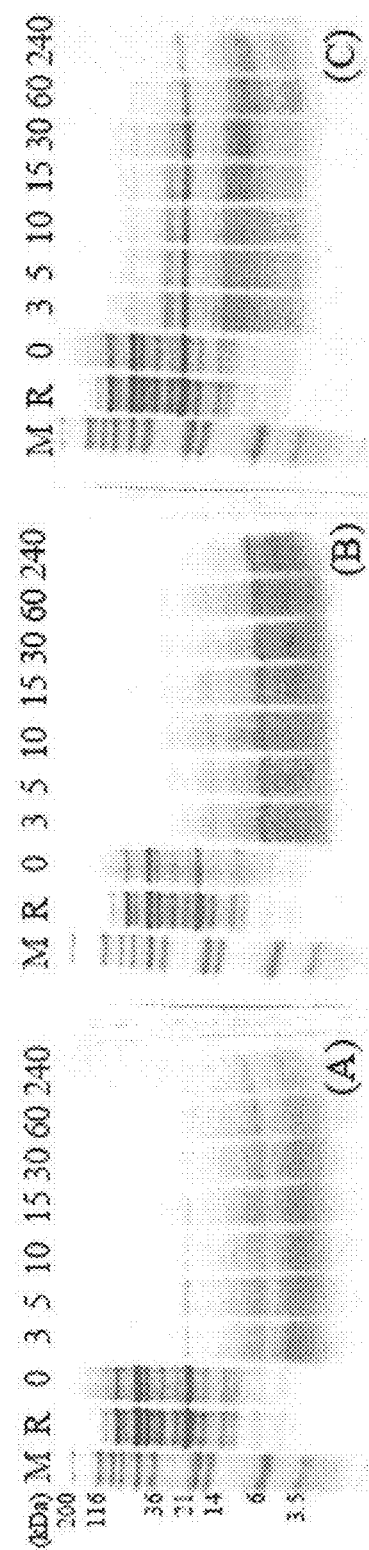
FIG. 6A-6C are photographs of SDS-PAGE of (A) Alcalase, (B) pepsin, and (C) Flavourzyme hydrolysates. "M" is the molecular weight marker. "R" is the reference peanut protein (pH 8.0). Subsequent lanes are marked 0-240 min of hydrolysis.

SDS-PAGE was used to study the molecular weight distributions of peanut meal proteins and peptides before and after hydrolysis. The molecular weight marker, raw peanut protein at pH 8.0, and the unhydrolyzed control sample at the optimum pH for each enzyme was run alongside hydrolysates on each gel (FIG. 6). The raw peanut protein and the unhydrolyzed controls had similar banding patterns on the Flavourzyme (pH 7.0) and Alcalase (pH 8.0) gels, but were slightly different on the pepsin gel due to the lower pH of the unhydrolyzed control. Table 43 defines the molecular weight regions of the main peanut seed storage protein (conarachin and arachin) subunits (Bianchi-Hall, C. M.; Keys, R. D.; Stalker, H. T.; Murphy, J. P. Diversity of seed storage protein-patterns in wild peanut (*Arachis, Fabaceae*) species. *Plant Systematics And Evolution* 1993, 186, (1-2), 1-15). Specifically, Ara h 2 protein, the predominant peanut allergen, migrates as a doublet to ~13 kDa and can be visualized in the reference and time 0 lanes (FIG. 3) (19).

TABLE 4

Molecular weight regions of the 5 main classes of peanut protein subunits, as determined by SDS-PAGE (18).

| Peanut Protein Region | Molecular Weight (kDa) |
|---|---|
| Conarachin | >50 |
| Acidic arachin | 38-49.9 |
| Intermediate | 23-37.9 |
| Basic arachin | 18-22.9 |
| Low molecular weight protein | 14-17.9 |

Generally, the intensity of the protein bands present in the unhydrolyzed control samples deteriorated with increasing hydrolysis time; however, unique banding patterns were observed for each of the enzyme digestions. SDS-PAGE confirmed that the majority of the protein bands were digested after 3 min of hydrolysis for each enzyme, in agreement with DH data (FIG. 4). Conarachin, acidic arachin, and intermediate MW proteins were digested after 3 min of Alcalase hydrolysis (DH 22.9%). However, one distinct band in the basic arachin region persisted until 30 min of Alcalase hydrolysis (DH 34.8%). Two clusters of low MW peptide bands <14 kDa were still evident after 4 hours of Alcalase hydrolysis (DH 61.8%), although their intensity was disintegrating, indicative of extensive hydrolysis into smaller peptides.

Conarachin and acidic arachin proteins were also completely digested after 3 min of pepsin hydrolysis (DH 7.3%). Subunits in the intermediate and basic arachin regions persisted through 60 min of hydrolysis (DH 14.6%). Throughout the duration of pepsin hydrolysis (DH 22.3%), two distinct bands between 6 and 14 kDa were visible along with a cluster of low MW peptides <6 kDa. These results are consistent with previous research by Sen, et al. (Sen, M.; Kopper, R.; Pons, L.; Abraham, E. C.; Burks, A. W.; Bannon, G. A. Protein structure plays a critical role in peanut allergen stability and may determine immunodominant IgE-binding epitopes. *J. Immunology* 2002, 169, (2), 882-887) which revealed that the allergenic Ara h 2 protein was resistant to enzymatic digestion. The intense band that occurs at ~10 kDa is a pepsin-resistant Ara h 2 fragment (FIG. 6B) that contains many of the same allergenic amino acid sequences as the unhydrolyzed protein (Sen et al., 2002; supra).

Flavourzyme hydrolysis resulted in more visible bands throughout the 4 hr digestion. Unlike Alcalase or pepsin, one band in the conarachin region was not fully digested until 10 min of hydrolysis (DH 13.3%). One band in the acidic arachin region and two bands in the intermediate MW region persisted through 60 min of hydrolysis (DH 33.9%). The same distinct band that was visible in the basic arachin region after 10 min of Alcalase digestion was also evident through the entire 240 min of Flavourzyme hydrolysis (DH 69.4%). This is indicative that the low pH, in conjunction with pepsin, aided in digestion of that particular basic arachin protein band. Although Flavourzyme had numerous visible bands throughout hydrolysis, the majority of the banding occurred as low MW peptides <14 kDa. The intensity of the Flavourzyme low MW peptides was notably less than that of the pepsin peptides (<14 kDa), suggesting that Flavourzyme resulted in a more extensive hydrolysis than pepsin.

All digestions resulted in an accumulation of low MW peptides less than 14 kDa. The relative intensity of the protein bands confirms that Alcalase and Flavourzyme resulted in the most digestion after 240 min of hydrolysis which reinforces the DH data provided in FIG. 4. These SDS-PAGE results are comparable to those found after another legume, chickpea protein isolate, was hydrolyzed with Alcalase and Flavourzyme (Clemente, A.; Vioque, J.; Sanchez-Vioque, R.; Pedroche, J.; Millan, F. Production of extensive chickpea (*Cicer arietinum* L.) protein hydrolysates with reduced antigenic activity. *J. Agric. Food Chem.* 1999, 47, (9), 3776-3781). In that study, although individual treatment with Alcalase (0.4 AU/g) or Flavourzyme (100 LAPU/g) reached the same DH (27%), the treatments resulted in different electrophoretic banding patterns and Flavourzyme had more visible bands persisting through 27% DH (Clemente et al., 1999, supra). The effects of Alcalase and Flavourzyme on minced yellow stripe trevally fish protein were also studied (Klompong, V.; Benjakul, S.; Kantachote, D.; Hayes, K. D.; Shahidi, F. Comparative study on antioxidative activity of yellow stripe trevally protein hydrolysate produced from Alcalase and Flavourzyme. *Int. J. Food Sci. Technol.* 2008, 43, (6), 1019-1026). Similar to our results, SDS-PAGE revealed that Flavourzyme hydrolysis yielded larger molecular weight peptides after 5% and 15% DH than Alcalase hydrolysis. However, all bands deteriorated after 25% DH with either enzyme which is contrary to the present data. Here, low molecular weight peptide bands persisted through 60% Alcalase hydrolysis and 70% Flavourzyme hydrolysis of defatted peanut meal which may be a result of different protein substrates or enzyme concentrations used.

Figure 7:
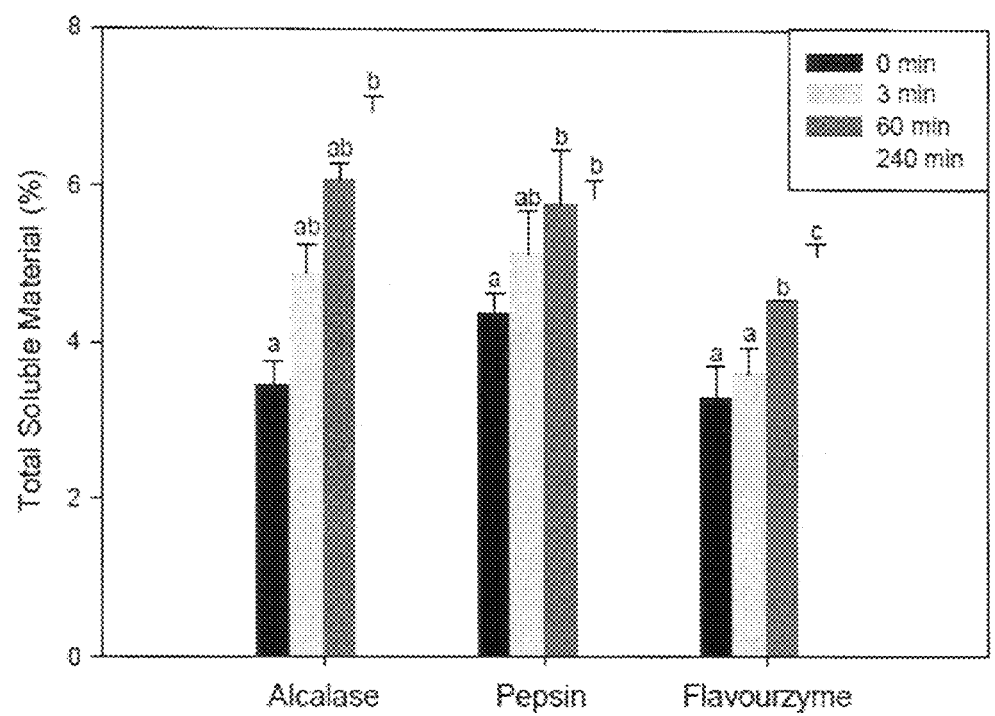
FIG. 7 is a graph showing total solids in the Alcalase, pepsin, and Flavourzyme soluble fractions as determined at 0, 3, 60 and 240 min. Means within a group followed by different letters are significantly different ($p<0.05$).

Total soluble material for all hydrolysates increased from approximately 3-7% with increasing hydrolysis time (FIG. 7). Unhydrolyzed Alcalase and Flavourzyme samples (0 min) had lower total solids than the unhydrolyzed pepsin samples which is in agreement with the higher pepsin protein solubility data. However, after 60 min, Alcalase hydrolysates total solids were greater than that of pepsin, which may be attributed to enzymatic activity on other soluble material (aside from protein) such as carbohydrates and fiber accumulating in the hydrolysates. Total soluble material increased a minimum of 30% for all hydrolysates and over 100% for Alcalase hydrolysates after 240 min. It is interesting to observe that the pepsin total solids reached a plateau after 60 min, which is consistent with the DH data.

Flavourzyme hydrolysate total solids were the lowest throughout hydrolysis. The total solids data is useful when considering commercial applications such as large batch spray drying for further use in functional foods or nutraceuticals.

Figure 8:
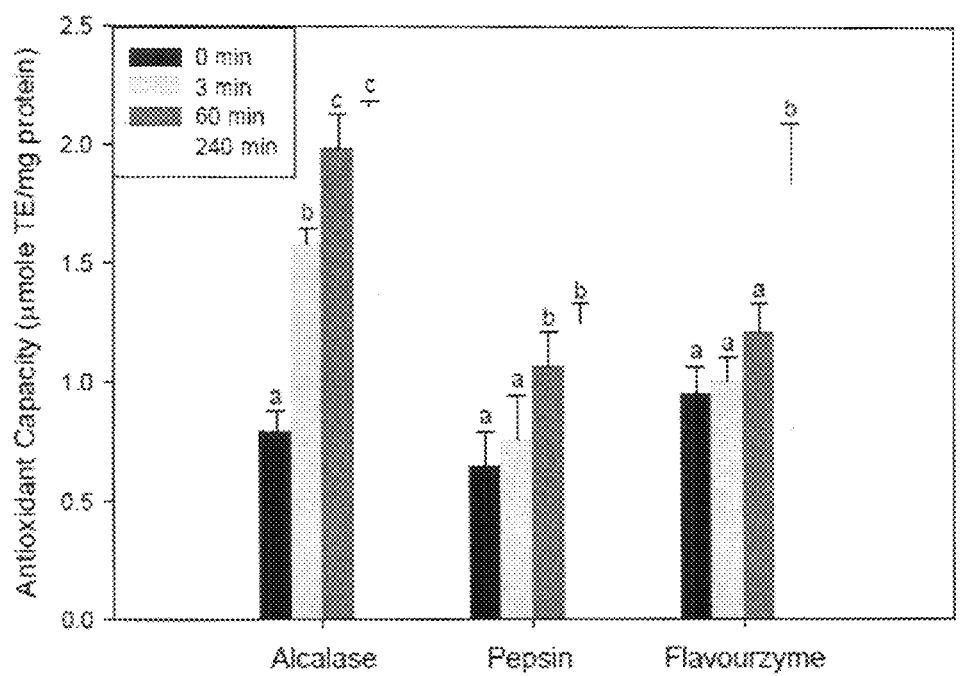
FIG. 8 is a graph showing antioxidant capacity of Alcalase, pepsin, and Flavourzyme hydrolysates. ORAC values were normalized to the amount of soluble protein in the samples. Means within a group followed by different letters are significantly different ($p<0.05$).

Some peptides generated through enzymatic hydrolysis are known to have bioactive properties (Megias, C.; Pedroche, J.; Yust, M. M.; Giron-Calle, J.; Alaiz, M.; Millan, F.; Vioque, J. Affinity purification of copper-chelating peptides from sunflower protein hydrolysates. *J. Agric. Food Chem.* 2007, 55, (16), 6509-6514). Antioxidant capacity was measured using ORAC, a well established and reproducible method of antioxidant capacity quantification (Sun, T.; Tanumihardjo, S. A. An integrated approach to evaluate food antioxidant capacity. *J. Food Sci.* 2007, 72, (9), R159-R165). Specifically, ORAC measures an antioxidants capacity to quench free radicals by hydrogen donation. Antioxidant capacity increased significantly ($p<0.05$) throughout hydrolysis for all enzymes (FIG. 8). Alcalase hydrolysates exhibited the highest antioxidant capacity, increasing significantly after only 3 min of hydrolysis. A significant increase ($p<0.01$) in Flavourzyme hydrolysate antioxidant capacity was not observed until 4 hr of hydrolysis. Pepsin hydrolysates exhibited the lowest antioxidant capacity across all time points, consistent with its DH. However, the pepsin hydrolysate values may have been negatively affected by the necessary increase in pH (from 2 to 7.4) to be compatible with the H-ORAC assay. This data is indicative that although the 3 enzymes studied produced unique peptides, and the antioxidant capacity of a peptide is dependent upon its composition, all hydrolysates produced in this study are capable of hydrogen atom transfer. While different peanut protein substrates and alternative methods of measuring antioxidant activity were used, these results are consistent with the previously discussed research performed by Hwang, et al. (Hwang, J. Y.; Shue, Y. S.; Chang, H. M. Antioxidative activity of roasted and defatted peanut kernels. *Food Res. Int.* 2001, 34, 639-647) and Chen, et al. (Chen, G. T.; Zhao, L.; Zhao, L. Y.; Cong, T.; Bao, S. F. In vitro study on antioxidant activities of peanut protein hydrolysate. *J. Sci. Food Agric.* 2007, 87, (2), 357-3), indicating that peanut protein hydrolysates are suitable natural antioxidants.

Those skilled in the art will recognize that this invention may be embodied in other species than illustrated without departing from the spirit and scope of the essentials of this invention. The foregoing discussion is therefore to be considered illustrative and not restrictive. The scope of the invention is only limited by the appended claims.

What is claimed is:

1. A method for removing aflatoxin from aflatoxin contaminated peanut meal comprising
   (a) combining said aflatoxin contaminated peanut meal, bentonite clay, and water to form a slurry,
   (b) stirring said slurry,
   (c) allowing said bentonite clay to bind to said aflatoxin, and
   (d) separating water insoluble material from water soluble material; wherein the amount of said aflatoxin remaining in said water soluble material is less than 20 ppb, wherein the amount of said aflatoxin present in said water insoluble material is less than 300 ppb, and wherein the quantity of said bentonite clay used is from approximately 0.1% to approximately 5% by weight of said peanut meal.

2. The method of claim 1 further comprising the step of combining at least one protease to said slurry.

3. The method of claim 1 wherein said peanut meal is selected from the group consisting of defatted peanut meal, partially defatted peanut meal, and full fat peanut meal.

* * * * *